US005284688A

United States Patent [19]

Hiatt

[11] Patent Number: 5,284,688

[45] Date of Patent: Feb. 8, 1994

[54] PRESSURE SENSITIVE ADHESIVE LABELS AND MANUFACTURE THEREOF

[75] Inventor: Norman A. Hiatt, Framingham, Mass.

[73] Assignee: Unique Label Systems, Inc., Framingham, Mass.

[21] Appl. No.: 870,617

[22] Filed: Apr. 16, 1992

[51] Int. Cl.[5] .............................................. B32B 9/00

[52] U.S. Cl. ........................................ 428/40; 428/41; 428/42; 428/78; 428/195; 428/200; 428/202; 428/204; 428/211; 428/343; 428/345; 428/347; 428/352; 428/537.5; 428/913; 428/914; 428/212; 427/208.8

[58] Field of Search .................... 428/40, 42, 195, 200, 428/202, 204, 211, 343, 345, 347, 352, 411.1, 537.5, 913, 914, 41, 78, 212; 427/148, 208.8

[56] References Cited

U.S. PATENT DOCUMENTS

| | | | |
|---|---|---|---|
| 2,633,432 | 3/1953 | Kenneway, Jr. | 117/76 |
| 3,920,499 | 11/1975 | Day et al. | 156/240 |
| 3,928,710 | 12/1975 | Arnold et al. | 428/483 |
| 4,219,596 | 8/1980 | Takemoto et al. | 428/41 |
| 4,444,818 | 4/1984 | Tominaga et al. | 428/36 |
| 4,726,979 | 2/1988 | Chapman | 428/200 |
| 4,818,576 | 4/1989 | Pennace et al. | 428/40 |
| 4,961,978 | 10/1990 | Doheny, Jr. et al. | 428/40 |
| 5,176,948 | 1/1993 | Nguyen et al. | 428/195 |

*Primary Examiner*—Patrick J. Ryan

*Assistant Examiner*—Marie R. Macholl

*Attorney, Agent, or Firm*—Pandiscio and Pandiscio

[57] ABSTRACT

A novel method of making a laminated label construction is provided which involves (1) providing a temporary carrier having a first relatively strong release surface and a second relatively weak release surface on opposite sides thereof, (2) forming a heat sealable lacquer on said first release surface so as to form a label face film having a predetermined edge configuration, (3) forming indicia on at least one selected portion of said label face film (in the case where printed labels are desired), and (4) forming a layer of a pressure-sensitive adhesive in overlying bonded relationship with the indicia (when present) and the protective lacquer. The pressure-sensitive adhesive has lateral dimensions less than those of the label face film. The lacquer face film comprises at least one heat-activatable ingredient that becomes tacky when heated and thereby provides heat-sealing properties. The carrier may be an elongate web that is wound on itself to form a roll-type package, with the pressure-sensitive adhesive facing outwardly and engaged by the weak release surface of the carrier. The differential release prevents any blocking or offsetting of the label as roll is wound and unwound. Each labels is easily peeled off of the web and transferred to a workpiece or other receiving object such as a plastic bottle by application of heat and pressure, whereby the edge of the lacquer film forms a heat seal with the surface of the receiving object.

36 Claims, 1 Drawing Sheet

PRESSURE SENSITIVE ADHESIVE LABELS AND MANUFACTURE THEREOF

BACKGROUND OF THE INVENTION

This invention relates to pressure-sensitive adhesive labels and decals, and particularly to the manufacture of same using radiation-cured films.

For a long time a customary process of manufacturing pressure-sensitive adhesive labels has involved production of a sheet or roll of laminated construction comprising a layer of label feedstock, a layer of a pressure-sensitive ("P/S") adhesive, and temporary carrier having a release surface. More specifically, a carrier web having a release surface, e.g., a plastic film or a smooth paper having a release layer of silicone, is engaged with a web of a label feed stock having a pressure-sensitive adhesive, with the pressure-sensitive adhesive being in contact with the release surface of the carrier web. The face stock may be made of paper or a suitable synthetic material such as a vinyl plastic material, and the face stock may be blank or may have printed indicia. Discrete labels are formed on the carrier web by die-cutting through the label face stock and the adhesive layer without perforating the carrier web. A standard practice is to make the laid-on labels using a die-cutting procedure as disclosed in the following U.S. Pat. Nos.: 4,253,899; 4,219,596; 2,391,539 and 3,166,186. Such labels are commonly referred to as "laid-on labels". Subsequently the face stock and the adhesive surrounding the individual labels are stripped as a continuous skeletal web or matrix, leaving discrete spaced apart labels adhered to the carrier web. The laid-on labels are then dispensed from the carrier web either manually or by a suitable automatic procedure.

The foregoing standard manufacturing technique suffers from the disadvantage of the need to die-cut the label face stock. This die-cutting procedure is expensive due to wasted face stock material and the need for precision die-cutting machinery.

Laid-on labels also may be made without die-cutting as disclosed in U.S. Pat. No. 4,022,926, issued to A. K. Keough et al for "Label Assemblies Without Die-Cutting". However, this form of label manufacture has limitations due to (1) the occurrence of beads of the label face film between adjacent labels, which constitutes non-adherent waste and may adversely affect equipment performance, and (2) the relative stiffness of the face film/adhesive laminate limits the ability to reliably dispense the labels and apply them to the desired workpiece, e.g., bottles. Also, the method of the patent commences with the step of applying a P/S adhesive to a temporary carrier web, and then printing the face film onto the adhesive. This order of steps presents the possibility of damaging the adhesive when the face film is printed.

A different approach was proposed in U.S. Pat. Nos. 4,253,899 and 4,219,596, both issued to Shiro G. Takemoto et al. These patents propose a method of making matrix-free labels. The label construction proposed by Takemoto et al comprises the following:

(1) a temporary carrier having a release surface; and (2) a label releasably adhered to the release surface of the carrier, with the label taking the form of a face film in contact with the release surface and a layer of pressure-sensitive adhesive on the side of the face film opposite the carrier, with the layer of pressure-sensitive adhesive being substantially in registration with the face film. In one embodiment Takemoto et al also provide a protective backing having a release surface in contact with the adhesive layer, the adhesion between the adhesive and the release surface of the protective backing being weaker than the adhesion between the face film and the release surface of the carrier, so as to enable the protective backing to be removed from the label and thereby expose the layer of adhesive while leaving the label releasably adhered to the carrier. In this label construction, the face film comprises a radiation-cured polymer.

The label construction of Takemoto et al is manufactured by a process that preferably involves the following steps:

(1) forming discrete label face films on the release surface of the carrier web by coating discrete areas of the release surface corresponding in size and configuration to the labels being formed with at least one layer of a radiation-curable liquid;

(2) curing the aforesaid liquid by exposure to polymerizing radiation;

(3) applying a pressure-sensitive adhesive in liquid form over the discrete liquid face films so that the adhesive is substantially in registration with the label face films; and (4) solidifying the liquid adhesive so as to form discrete labels, with each label having a face film releasably adhered to the release surface of the carrier web and a layer of pressure-sensitive adhesive on the side of the label facing away from the carrier web. If a protective backing sheet is used, it is applied after the pressure-sensitive adhesive layer is formed, with the adhesion between the adhesive and the release surface of the backing being weaker than the adhesion between the face film and the release surface of the carrier web, so that the protective backing may be removed from the label to expose the layer of adhesive on the label while leaving the label releasably adhered to the carrier web.

The technique disclosed in U.S. Pat. Nos. 4,219,596 and 4,253,899 avoids the die-cutting operation, and also the resulting loss of face stock. However, the method of making labels and decals disclosed in U.S. Pat. Nos. 4,219,596, and 4,253,899 has the disadvantage that it requires substantially exact registration of the pressure-sensitive adhesive with the discrete label face films. This is a disadvantage in that substantial precision is required to obtain the degree of registration required by Takemoto et al, since if the adhesive does not fully cover the face film, the edges of the face film will not adhere to the surface of the object or workpiece to which the label is transferred.

A related method of making labels is disclosed in British Patent Specification No. 827,313, published Feb. 3, 1960. This patent discloses a dry-release pressure-sensitive label construction comprising a printed layer or assembly of layers which are adapted to be transferred and are printed or coated on a temporary dry-releasing paper support from which the printed layer or layers may be dry-released, with the paper support being impregnated or coated so as to have a release surface. The method and label construction disclosed in British Patent Specification No. 827,313 provides teachings similar to those of Takemoto et al but is handicapped in that it does not utilize radiation-curable polymers to form the labels. Reed uses a solvent based system that is eminently unsatisfactory because of disposal concerns and also because it is limited as to printing speed.

Reed also does not address the question of registration of the several layers of his label construction, particularly as it affects the reliability of the adhesion of the label to the support to which it is ultimately transferred.

SUMMARY OF THE INVENTION

The present invention is designed to overcome the limitations and disadvantages of manufacturing processes such as those disclosed by U.S. Pat. Nos. 4,022,960, 4,219,956 and 4,253,899, and British Patent Specification No. 827,313.

A primary object of this invention is to overcome the limitations of the process requirement of the method disclosed in U.S. Pat. Nos. 4,219,596 and 4,253,899 regarding registration of the pressure-sensitive adhesive with the label face films.

Another object is to eliminate the need of a separate protective backing with a silicone release liner as suggested by Takemoto et al.

Still another object is to provide a method of manufacturing labels where the requirement of registration of adhesive and face film is substantially less critical than with the technique disclosed by the Takemoto et al patents.

Still another object of this invention is to provide a commercially viable method of making matrix-free labels and decals using radiation-curable liquid films, with the method being capable of producing labels and decals having an aesthetically pleasing appearance that is at least equal to that of commercially available pressure-sensitive labels and decals manufactured by methods already known to persons skilled in the art.

Another more specific object of the invention is to provide a method of manufacturing labels and decals with a pressure-sensitive adhesive coating which takes advantage of existing application equipment and which makes it possible to provide preprinted or blank labels or decals.

A further specific object is to provide a method of manufacturing P/S adhesive coated dry release transfers that can be made either thick or thin and embody either U.V. curable components or solvent based components.

These and other objects of the invention are achieved by providing a laminated label construction and a method of manufacturing same, that, in its preferred form, involves provision of (1) a temporary carrier having a first relatively strong (tight) release surface and a second relatively weak (easy) release surface on opposite sides thereof, (2) a heat sealable protective lacquer which functions as a label face film on said first surface of the carrier, (3) indicia printed onto the protective lacquer (in the case where printed labels are desired), and (4) a pressure-sensitive adhesive layer overlying the indicia (when present) and the protective lacquer. In this description, the term "relatively strong release" means that the adhesion of the release surface to another layer is stronger in relation to the adhesion that occurs with a "relatively weak release" surface. In accordance with the invention, the pressure-sensitive adhesive has lateral dimensions less than those of the protective lacquer.

The invention may take the form of a UV system or a solvent-based system. Preferably the invention is a UV system, i.e., the lacquer used to form the face film, the inks used for the printed indicia, and the pressure-sensitive adhesive are all polymerizable materials, e.g., acrylic materials that are curable with ultra-violet (UV) light. In a solvent-based system, the lacquer, the printing ink(s), and the liquid used to form the pressure-sensitive adhesive, are all solvent-based materials that are first dried by heating to evoke volatile solvents and then cooled to set in adherent solid layers. As a specific and critical feature of the invention, the lacquer face film comprises at least one heat-activatable ingredient that becomes tacky when heated and thereby provides heat-sealing properties. This arrangement facilitates manufacture of labels on a commercially acceptable basis, and improves on the manufacturing procedure specified in U.S. Pat. Nos. 4,219,956 and 4,253,899 issued to Takemoto et al, which is handicapped by the requirement of a pressure-sensitive adhesive/face film registration, so that the layer of adhesive is coextensive with the face film and does not flow into areas of the carrier web release surface between discrete label faced films. The foregoing limitation of the Takemoto process makes it difficult to obtain high yields of acceptable product and thereby increases manufacturing cost, since if the adhesive extends beyond or short of the face film, the support to which the label is transferred will be tacky where the adhesive extends beyond the label face film and the label will not bond t the support where the adhesive does not cover the face film. With the present invention, it is preferred that the temporary carrier be an elongate web that is wound on itself to form a roll-type package so that the pressure-sensitive adhesive faces outwardly and is engaged by the weak release surface of the carrier. The differential release prevents any blocking or offsetting of the label or decal as the base stock is wound into a roll.

THE DRAWINGS

In the drawings, like reference numerals are utilized to identify like elements. It also should be understood that the drawings are intended to be illustrative only. Thus, for convenience and clarity of illustration, thicknesses of the various layer or coatings are neither shown to scale nor shown exactly in accordance with their relative proportions. Similarly, cross-sectional views are shown without cross-hatching for clarity.

FIG. 1 is a sectional view in side elevation of a section of an elongate carrier web with a plurality of spaced labels (only two are shown for convenience of illustration) having an improved laminated label construction provided by the present invention; and FIG. 2 is a sectional view in side elevation showing application of one of the labels of FIG. 1 to the surface of a selected article.

DETAILED DESCRIPTION OF THE INVENTION

Figure 1:
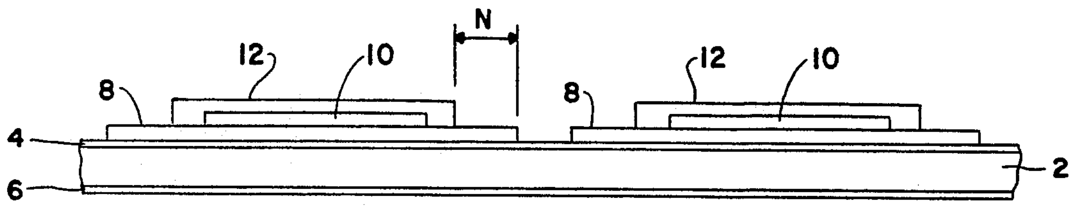

FIG. 1 illustrates a pressure sensitive adhesive construction made in accordance with this invention. As used herein, the term "pressure sensitive adhesive label" means and includes various forms of dry-release transfer materials, e.g., a label or decal, having a P/S adhesive coating for applying it to a suitable substrate such as a plastic bottle. In this case the label construction comprises a temporary flexible carrier which may be in the form of a sheet of finite size and predetermined configuration, e.g., a rectangular or circular sheet, but preferably is in the form of an elongate web 2 that can be rolled up on itself.

Carrier 2 may be made of various materials. Thus, it may be made of a cheap paper such as kraft or a more expensive paper such as glassine, or it may take the form of synthetic polymer material such as a polyethylene, polypropylene or polyester film, e.g. the polyester film sold by E.I. DuPont de Nemours and Company under the trademark "Mylar". In the case of a polypropylene carrier, it is preferred to use a biaxially oriented polypropylene. In the case of a paper carrier, whether in the form of a web or cut sheets, it should have a thickness determined by its having a paper weight that preferably is in the range of 40 to 60 pounds per 3000 sq. ft. ream. Preferably, but not necessarily, the synthetic films used as a carrier have a thickness in the range of 2 to 5 mils, i.e., 0.002 to 0.005 inch). The polymer films used as a carrier may be clear or colored or even opaque.

If the carrier is a paper web or sheet, its top and bottom sides (as viewed in FIG. 1) have differential release coatings 4 and 6 respectively, with the coating 4 providing a relative strong release and coating 6 providing a relatively weak release. If a polymer film carrier is used, the coating 4 is omitted since the upper surface of the carrier will function as the strong release surface and the label will be printed directly on that surface. In this connection it is to be appreciated that the paper carrier may be a laminated product, e.g., a two-ply laminate comprising a paper web or sheet with an extruded coating of, for example, polyethylene or propylene on one side (the top side as viewed in FIG. 1), so that the extrusion coating functions as the relatively strong release layer 4. The extrusion coating has a thickness in the range of 0.5 to 1.0 mils.

It is to be noted that paper webs with extruded thermoplastic polymer coatings, e.g., with extruded polyethylene coatings, are well known and are used extensively in the packaging industry. Accordingly if such a material is used, the only step required to obtain the differential release is to coat the second side of the web with a suitable weak release coating 6. Preferably release coating 6, and also release coating 4 in the case where the carrier is made of paper but does not already have an extruded coating as described above, constitutes a film of a cured silicone resin, although other release agents may be used. The silicone release coatings are made by coating the carrier with a selected liquid silicone resin solution, followed by drying and curing the resin so as to form an adherent polymer film. Release agent coatings 4 and 6 may be relatively thin, each preferably being in the range of 0.5 to 1.5 microns thick. Preferably release coating 6 is a cured silicone with a release value of 10 grams per lineal inch, based on ASTM test UM 502. In contrast the coating 4 or the upper surface of the polymer film will have a release value 3 to 10 times greater than release coating 6.

Overlying release coating 6 is a film of a protective lacquer 8 which acts as a protective label face film. Preferably, but not necessarily, lacquer film 8 is applied so as to have a thickness in the range of 0.1 to 2.0 mils, more preferably 0.2 to 0.6 mils. The protective lacquer film may be transparent, translucent or opaque, and may be colored or colorless. An opaque lacquer label face film is acceptable if a blank label is desired. However, the invention also may be practiced so as to produce printed labels. In such case, suitable indicia, e.g., alphanumeric characters and/or an ornamental design is applied to the lacquer by a suitable printing technique. Such indicia are represented in FIG. 1 as an ink layer 10. The ink layer terminates short of the boundaries of the lacquer film, as shown in FIG. 1. The ink layer is relatively thin, preferably, but not necessarily, having a thickness in the range of 0.2 to 0.6 mils.

Overlying the ink layer 10 is a printed layer of a pressure sensitive adhesive 12. The latter layer is relatively thin, preferably having a thickness in the range of 0.2 to 0.6 mils. More importantly, the adhesive film 12 covers and extends beyond the boundary of the printed indicia layer 10 but terminates short of the boundary of the lacquer film 8 by an amount "n" shown in FIG. 1 which must be large enough to permit the edge(s) of the lacquer film to be engaged with the surface of an object on which the label is to be applied. The value "n" may be as little as 1/32nd inch, but preferably it is in the range of 1/16th to ⅛th inch. This deliberate oversizing of the lacquer film relative to the P/S adhesive substantially eliminates or reduces the registration problem that exists with the Takemoto et al label construction method and also facilitates transfer and attachment of the label to a workpiece to be labelled.

In this connection, it is to be appreciated that the lacquer label face film 8 is designed to have a heat sealing property. Therefore, since it is printed so as to extend beyond the periphery of the later formed P/S adhesive layer 12, the edge(s) of the lacquer face film will serve to seal the label on transfer to an object to be labelled, since both heat and pressure will be used during the transfer step to bond the label to the receiving object. It is desired that the lacquer be formulated and applied to the carrier so it is dry and non-tacky at room temperature, but will develop tack when heated to a temperature in the range of 50 to 120 degrees C. The lacquer may be printed in the form of a solvent based or ultra-violet ("UV") system.

A solvent-based system utilizes a solvent based heat seal lacquer that comprises at least one thermoplastic resin and/or at least one thermoplastic rubber with heat seal properties. Various resins may be used. By way of example, the lacquer may comprise ethylene-vinyl acetate, a methacrylate resin or a soluble thermoplastic polyester. By way of example, the thermoplastic rubber may be a block copolymer of styrene with butadiene, ethylene-propylene or isoprene. These resins or rubber materials are dissolved in a suitable solvent, preferably in combination with one or more tackifying resins and plasticizers. The solvent should comprise about 40–80% by weight where the lacquer is applied by screen printing, with 40–50% being preferred for screen printing. Formulations of solvent-based heat seal lacquers would typically contain ratios of 8 to 1 or 9 to 1 of thermoplastic resin/thermoplastic rubber to tackifier/plasticizer. A surfactant, e.g., a fluorocarbon compound, may be included in the solvent based lacquer for wetting capability.

Various tackifiers and plasticizers may be incorporated in the solvent-based heat seal lacquer. The tackifiers used may be a liquid or a solid, but preferably the lacquer comprises a mixture of liquid and solid tackifiers blended to assure that the lacquer has the proper fluidity for the printing operation, e.g., a mixture of ester resins derived from hydrogenated rosin and/or hydrocarbon resins. Examples of suitable tackifiers are Staybelite Ester 3 (liquid at room temperature, 25 degrees C), Stabelite Ester 10 (solid at room temperature), and Kristalex 3070 (solid at room temperature) made by Hercules, Inc. of Wilmington, Del. Suitable plasticizers are those that are solid at room temperature and melt in the range of 40 to 80 degrees C, such as triphenyl phosphate, dicyclohexyl phthalate, glycerol tribenzoate, triethylene-glycol dibenzoate, and neopentyl glycol dibenzoate.

The U.V. curable heat seal lacquer may be a commercially available U.V. curable screen printable varnish such as Nobel UVS-383 made by Nobel Printing Inks Corp. of Langhorne, Pa., or Norcote 80-049 made by Nor-Cote International, Inc. of Crawfordsville, Ind., modified with tackifiers and/or plasticizers to give heat seal properties. These tackifiers and plasticizers may be a combination of both liquids and low melting solids which are soluble in the varnish, e.g., those compounds listed above. A suitable surfactant, preferably a fluorocarbon surfactant, is a necessary component in the lacquer in order for the lacquer to wet the applied release coating 4 in the case of a paper carrier or the upper surface of the carrier when the carrier is a plastic film having only the weak release coating 6. In accordance with this invention commercially available U.V. curable screen printable varnishes are modified with tackifiers and/or plasticizers and a surfactant as described above so as to provide formulations made up on a wt. % basis of 70 to 90% of the u.v. screen varnish, 10 to 30% tackifiers and/or plasticizers, and up to 2% fluorocarbon surfactant The tackifiers used in the U.V. curable lacquers may be in liquid or solid form, but a mixture of liquids and solids is preferred to assure that the lacquer has the proper fluidity for the printing operation. Ester resins derived from hydrogenated rosin and/or hydrocarbon resins are suitable tackifiers. Suitable solid tackifiers are those that are solid at room temperature and melt in the range of 40 to 80 degrees C. Examples of suitable commercially available tackifiers are Staybelite Ester 3, Stabelite Ester 10, and Kristalex 3070.

Suitable plasticizers are those that are solid at room temperature and melt in the range of 40 to 80 degrees C, such as triphenyl phosphate, dicyclohexyl phthalate, glycerol tribenzoate, triethylene glycol dibenzoate and neopentyl glycol dibenzoate. It appears that best results occur when the lacquer includes both tackifier and plasticizer compounds.

Alternatively, the basic U.V. varnish can be formulated by or for the user, instead of employing a commercially available varnish. This can be done by employing a copolymerizable mixture of monomers and prepolymers (the latter term is construed to include oligomers), along with appropriate photoinitiators and also accelerators, if necessary. Then this specially formulated varnish is combined with tackifiers and/or plasticizers as well as a fluorocarbon surfactant as is done with commercial varnishes as described above.

Preferably the varnish is formulated using a combination of multifunctional acrylate monomers and aliphatic urethane acrylate oligomers. Among those multifunctional acrylate monomers that are useful in practicing this invention are those constituting esters of acrylic acid and lower alkylacrylic acids such as methacrylic acid. By way of example but not limitation, preferred multifunctional acrylate monomers are tripropylene glycol diacrylate (TRPGDA), trimethylolpropane triacrylate (TMPTA) and dipentaerythritol monohydroxy-pentacrylate. Suitable aliphatic urethane acrylates are Ebecryl 230, Ebecryl 4883, and Ebecryl 8804, made by Radcure Specialties of Atlanta, Ga., and CN-966 made by Sartomer Co. of Exton, Pa.

Although aliphatic urethane acrylates are preferred for making the UV-curable lacquer, other prepolymers also may be used, e.g., acrylated polyester resins, and acrylated urethane resins such as acrylated polyether-polyisocyanate resins and acrylated polyester-polyisocyanate and polyether-isocyanate resins. It is advantageous and even preferred that the monomers and oligomers employed include at least one monomer or oligomer having two or more acrylate groups to promote rapid cross-linking polymerization, such as trimethylolpropane triacrylate. Other cross-linkers that may be used include pentaerythritol-tetraacrylate and pentaerythritol-triacrylate. Useful acrylated polyether-polyisocyanate resins and monomer solutions thereof for radiation curing are described in U.S. Pat. No. 3,989,609, the entire disclosure of which is incorporated herein by this reference thereto. This patent describes compositions comprising a liquid prepolymer which is the reaction product of a polyisocyanate with a polyether triol and an unsaturated alcohol such as alkyl alcohol, a copolymerizable acrylate ester monomer, and at least one monomer having three or more unsaturated acrylate or methacrylate groups to promote cross linking. U.S. Pat. No. 3,857,768 describes polyacrylate-methacrylate compositions that may be used in practicing the present invention. The entire disclosure of this patent is incorporated herein by this reference thereto.

Examples of photoinitiators that may be used are Darocur 1173 and Darocur 1664 made by EM Industries of Hawthorne, N.Y. A preferred accelerator is Ebecryl P115 made by Radcure Specialties.

For the purposes of this invention a suitable formulation for the basic U.V. varnish consists of the following on a wt % basis: 35-60% multifunctional monomer, 35-55% prepolymer, 3-5% photoinitiator, and 2-3 accelerator (optional). By way of example, the basic U.V lacquer may comprise 43% TRPDGA, 14% TMPTA, 38% Ebecryl 4883, and 5% Darocur 1173.

The lacquer label face films 8 are formed by applying the solvent-based or UV-curable heat seal lacquer to the upper release surface of the carrier web in one or more discrete areas corresponding to the label(s) being made, and converting the liquid to a solid state by heating and cooling (solvent-based lacquer) or by exposing it to polymerizing radiation (UV-curable lacquer). Conversion of the liquid lacquer on the release surface of the carrier web results in a solid lacquer film releasably adhered to the release surface. Preferably the lacquer label face film is formed using a UV-curable liquid lacquer that includes a selected photoinitiator to promote the UV radiation-curing process, with the result that when the liquid film is cured by ultraviolet radiation, the solid lacquer face film 8 will also comprise a residue of the photoinitiator formed by exposure thereof to the radiation. As is illustrated in FIG. 1, according to the preferred mode of practicing this invention, a plurality of lacquer label face films 8 are formed on discrete, spaced apart areas of the carrier.

Preferably the lacquer face film 8 consists of a single layer, but it may comprise more than one layer of the same or different lacquer compositions, with each layer being cured separately. However, it is contemplated also that a plurality of layers of heat-curable or radiation-curable liquid lacquers may be applied and then cured in a single curing operation. For example, a label face film may comprise a clear, flexible but relatively hard wear-resistant lacquer layer in contact with the release surface of the carrier and a flexible, heat sealable lacquer layer covering the hard layer. Also one layer may be colored and the other clear.

The viscosity of the solvent-based and radiation-curable liquid lacquers may be varied by altering the relative proportions of their components. In the case of the UV-curable lacquers, increasing the proportion of monomer will decrease the viscosity of the composition and vice versa. The viscosity is preferably relatively low so that a thin film of the liquid can be applied with conventional printing or coating equipment. The optimum viscosity depends, of course, upon the particular printing or coating equipment employed and can thus be readily determined by one skilled in the operation of such equipment.

Preferably the liquid is of relatively low viscosity, preferably below about 200 seconds as measured with a No. 2 Zahn cup, more preferably below about 100 seconds, and most preferably between about 80 and about 100 seconds. Zahn cups are widely used and are described, for example, in ASTM Special Technical Publication No. 500, "Paint Testing Manual", 13th Edition (1972.

The inks used are preferably commercially available solvent-based or U.V. inks appropriately chosen for the particular label construction system and/or the particular printing method used. By way of example, solvent-based inks sold by Gotham Ink & Color Co. of Long Island City, N.Y. may be used. Examples of solvent-based inks are Gotham white screen ink 44-015 and Gotham black gravure ink 23-440. Also by way of example, the following U.V.-curable silk screen inks sold by Nobel Printing Inks Corp. of Langhorne, Pa. may be used: UVS-001 (Black), UVS-215 (Cyan), and UVS-021 (white).

The P/S adhesive layer may be formed from a solvent-based fluid adhesive composition or from a U.V.-curable adhesive composition. In the case where solvent-based lacquers and inks are used, it is preferred to use a solvent-based adhesive, so as to have a complete solvent-based system. Similarly a U.V.-curable fluid adhesive composition is used when U.V. curable lacquers and inks are used, so as to have a complete U.V.-curable system. Commercially available acrylic P/S adhesives in suitable solvents are preferred, and these are available from a number of companies such companies as Monsanto, Ashland Chemical and National Starch amongst others. By way of example, the following commercially-available solvent-based pressure-sensitive adhesives may be used to practice this invention: (a) GMS-1753 which is preferred for gravure printing and is provided by Monsanto Polymer Products Co., St. Louis, Mo., and (b) Aroset 1835-Z-47, which is preferred for screen printing and is produced by Ashland Chemical Co., Columbus, Ohio.

Suitable commercially available U.V.-curable P/S adhesives are sold by such commercial sources as Beacon Chemical, Acheson Colloids, Quretech and Northwest Coatings. Examples of such adhesives are Magnacryl 2793 (Beacon), ML 25184 (Acheson), JRX-1068 (Quretech) and U.V.-curable-10152 (Northwest). All of these sources produce adhesives that can be screen printed, either rotary screen or flat-bed screen. It is significant to note also that a suitable U.V.-curable adhesive can be produced by modifying the U.V.-curable lacquers described above. This is achieved by reducing the relative amount of multifunctional monomers and prepolymers and increasing the relatives amount of tackifier(s) and/or plasticizer(s).

Where two or more U.V. curable compositions are successively applied, e.g., the lacquer, ink and P/S adhesive, it is preferred that each be fully polymerized by radiation exposure prior to application of the next layer. However, they can be partially polymerized, including solidification of their surfaces, by a first exposure prior to application of the next layer, with full polymerization being obtained by a subsequent additional exposure to radiation.

Among the methods of printing that may be used for printing the lacquer face label films, the indicia and the P/S adhesive layers are gravure printing, screen printing, rotary letter press printing and flexography. Which method is used for each layer is determined by the nature of the material that is being printed.

Following is an example of a specific U.V label system constituting a preferred embodiment of the invention.

EXAMPLE 1

A 2 mil polyethylene web is coated on one side with a silicone release layer as shown at 6 in FIG. 1 having a release value of 10 grams per lineal inch. Onto this web a plurality of rectangularly shaped label face films are formed by screen printing discrete areas of the other side of the web with a lacquer having the following composition by weight: 70.5% Nobel UVS-383 Varnish, 12.5% triphenylphosphate as plasticizer, 15.0% Stabelite Ester 3 as tackifier, and 2.0% FC-430 (a fluorocarbon surfactant from 3M Co. of Minn.). This lacquer is cured in air using U.V. radiation. The cured face films each have a thickness of about 0.4 mils.

Next indicia are screen printed on each lacquer label face film using a black U.V. curable silk screen ink sold by Nobel Printing Inks Corp. under the designation UVS-001. This ink is cured in air by U.V. radiation. Then a commercially available P/S adhesive sold under the name of Magnacryl 2793 is screen printed over the indicia, with the adhesive coating being continuous over the face film but stopping short of the edges of the lacquer film by about 1/32nd to 1/16th inch. This adhesive is cured by U.V. radiation, leaving a plurality of dry laminated labels on the carrier.

The carrier web is then wound on itself so that release surface 6 contacts adhesive layer 12.

Following is an example of a specific gravure-printable solvent-based label system embodying the invention.

EXAMPLE 2

A paper web having a paper weight of 40 pounds per 3000 sq. ft ream is provided. This web has a thin silicone coating on each side with the one corresponding to silicone coating 4 shown in FIG. 1 having a release value of 80 grams per linear inch, and the one corresponding to silicone coating 6 shown in FIG. 1 having a release value of 10 grams per linear inch (both values determined by ASTM test UM 502). The release coatings each have a thickness of about 1.0 micron. A plurality of rectangularly shaped label face films are formed by gravure printing discrete areas of the web with a thermoplastic lacquer having the following composition by weight: 27 wt. % ELVAX -140 W (an ethylene vinylacetate made by E.I. DuPont de Nemeurs Co., Wilmington, Del.), 30% KRISTALEX (a tackifier made by Hercules Co.), 2% FC-430 (a surfactant made by 3M Co.), and 68% toluene (the latter functions as a solvent to provide the correct fluidity for gravure printing). The lacquer is dried by heating it in air, e.g. by exposure to infra-red radiation and then chilled in air to set the thermoplastic lacquer. This is done by passing the web through a first hot air drying station having an air temperature of about 90-105 degrees C, and then passing it over a chill roll that is at a temperature of about 10–15 degrees C, with the web moving at a speed that assures proper drying and setting.

Next indicia are gravure printed on each label face film using Gotham black gravure printing ink 23-440. The applied ink is dried and set in the same way using the same temperature conditions as the lacquer face films. If two or more colored inks are printed, each ink is dried and set individually before another ink is applied.

Then a solvent-based pressure sensitive adhesive layer is gravure printed over the indicia. This is accomplished using Monsanto GMS-1753 solvent-based P/S adhesive-forming liquid. The applied liquid adhesive layer is continuous over the expanse of the lacquer face film, but stops short of each side edge of the face film by about 1/16 inch. This adhesive is then dried and set in the same manner using the same temperature conditions as the lacquer face film and the thermoplastic ink used to print the indicia. The carrier web is then wound on itself so that the adhesive layer contact and are covered by release coating 6.

It is to be understood that the invention may be practiced on a continuous basis, using equipment having a plurality of printing stations and a plurality of curing (for UV System) or drying/setting (for solvent-based system) stations arranged in sequence so as to carry out the several steps of the method of this invention.

Figure 2:
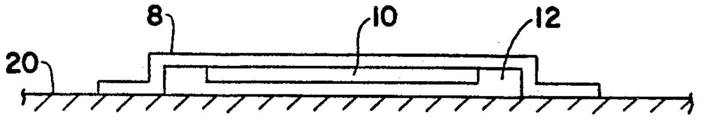

The labels produced by the invention, e.g., the labels made according to Examples 1 and 2, are used by peeling the lacquer face films off of the carrier and pressing them under heat onto a workpiece, e.g., an object with a flat or contoured surface. The pressure sensitive adhesive holds the label in place as the lacquer is activated by heat to make it tacky enough to adhere to the workpiece where it extends beyond the periphery of the adhesive. On cooling the lacquer looses its tackiness and forms a tight seal with the workpiece. This relationship of one of said labels with a workpiece to which it has been applied is shown in FIG. 2 where the margin of the label face film 8 is seen to be bonded directly to the surface of a workpiece 20.

The invention provides a number of advantages. For one thing it utilizes known printing techniques and the materials required are either commercially available or can be readily formulated. Secondly the novel method of this invention is simple and avoids or reduces problems or overcomes disadvantages of prior art methods. Thirdly the finished product can be made at a competitive cost and with a high quality, and can be used with ease. A fourth advantage is that the product can be produced in sheet or web form. If the labels are produced on individual cut sheets (each of which may carry a single label or a plurality of labels), the sheets may be stacked together, with the adhesive of the labels being engaged and protected by the back side release surface of the adjacent sheet. If the labels are produced on an extended carrier web, the latter may be slit to form individual cut sheets each carrying one or more labels, or the web may be wound on itself with the pressure sensitive adhesive layer being engaged by the relatively weak release layer 6. Where the web is wound on itself into a convenient size roll, the differential release assures that when the web is paid out from the roll, the labels will not become detached from or shift relative to the web since the weak release layer will separate readily from the P/S adhesive layer. A fifth advantage is that various carriers may be used, and in the case of plastic film carriers, only one silicone release layer (6) needs to be applied to the carrier. A sixth advantage is that conventional high speed printing and drying/setting or curing equipment can be used so as to provide for manufacture on a continuous basis thus the UV form of the method of this invention may be practiced using apparatus similar to that shown in FIG. 2 of U.S. Pat. No. 4,022,926. Still other advantages will be obvious to persons skilled in the art.

It is to be understood that as used herein, the term "label" is to be construed as including decals.

The invention is susceptible to modifications other than those described or implied above. Thus, for example, while the face films preferably terminate short of the edges of the carrier, they may terminate substantially flush with one or both edges of a web-type carrier or all or less than all of the edges of a rectangular cut carrier sheet. Of course, the exact chemical composition of the silicone release coatings is not a novel aspect of the invention, since silicone release coatings with release properties as required by the invention may be made according to various formulations known to persons skilled in the art. Furthermore it is recognized that a weak release surface on the rear side of the carrier may be omitted in the case where the product is made in cut sheet form and the sheets are stacked together but separated by a temporary protective liner sheet with a weak release coating that is interposed between the P/S adhesive on one carrier sheet and the next carrier sheet. However, having to use a protective liner negates one of the advantages of the preferred embodiments of the invention. Also, while it is most practical for the label-carrying cut carrier sheets to be rectangular, they may have other polygonal shapes and may even have circular and elliptical edge configurations if they are die cut out of an elongate carrier web. Still other modifications will be obvious to persons skilled in the art.

What is claimed is:

1. A dry-release label construction comprising:

(a) a carrier having first and second opposite sides and a release surface on said first side thereof; and (b) at least one label releasably adhered to said release surface, said at least one label comprising a label face film overlying and releasably adhered to said release surface, said label face film being dry and non-tacky at room temperature and having heat-sealing properties, and a pressure-sensitive adhesive layer overlying said label face film, said label face film and said adhesive layer each having finite geometrical dimensions, with said label face film having an outer boundary and the adhesive layer terminating short of said outer boundary of the label face film.

2. A label construction according to claim 1 wherein said carrier has one or more edges and said label face film terminates short of said one or more edges of said carrier.

3. A label construction according to claim 1 having a plurality of said labels releasably attached to said release surface.

4. A label construction according to claim 3 wherein said carrier is an elongate web having a release surface on said second side thereof, and further wherein said web is wound on itself so that said adhesive layer of each of said plurality of labels is engaged by said second side release surface.

5. A label construction according to claim 4 wherein said release surface on said first side of said carrier has a greater holding power than said second side release surface.

6. A label construction according to claim 5 wherein both of said release surfaces are cured silicone resin films.

7. A label construction according to claim 1 wherein said carrier is a sheet of predetermined edge configuration, and further including a second label construction in stacked relation therewith, with the adhesive layer of the label of said second label construction being in contact with the other side of said carrier sheet.

8. A label construction according to claim 1 wherein said carrier is a synthetic polymer film having a release coating on said second side.

9. A label construction according to claim 8 wherein said carrier is made of polyethylene, polypropylene or a polyester.

10. A label construction according to claim 1 further including a silicone release coating on said second side of said carrier.

11. A label construction according to claim 1 wherein said carrier is a paper and each of its opposite sides has a release coating, with the release coating on said first side having greater holding power than the release coating on the side thereof opposite said first side.

12. A label construction according to claim 11 wherein said release coatings consist essentially of a cured silicone resin.

13. A label construction according to claim 11 wherein the release coating on said first side of the carrier comprises an extruded polyethylene film adhered to said carrier.

14. A label construction according to claim 1 wherein said label face film comprises at least one tackifier selected so that said face film is non-tacky at room temperature and becomes tacky when heated.

15. A label construction according to claim 14 wherein said label face film comprises at least one tackifier and at least one plasticizer.

16. A label construction according to claim 1 further including printed indicia in the form of at least one adherent layer of an ink overlying a portion of said label face film and coated with said pressure-sensitive adhesive.

17. A label construction according to claim 1 wherein said label face film is formed of a UV-cured lacquer.

18. A label construction according to claim 17 wherein said adhesive layer is a UV-cured material.

19. A label construction according to claim 1 wherein said label face film is formed of a solvent-based lacquer.

20. A label construction according to claim 19 wherein said pressure-sensitive adhesive layer is formed from a solvent-based adhesive composition.

21. A label construction according to claim 1 wherein said carrier is an elongate web having a release surface on said second side thereof, a plurality of said labels are releasably attached to the release surface on said first side of said carrier, and said web is wound on itself so that said adhesive layer of each of said labels is engaged by said second side release surface.

22. A label construction according to claim 22 wherein said web has opposed parallel side edges, and the label face film of each label terminates short of said opposed parallel side edges.

23. A label construction according to claim 1 wherein said adhesive layer terminates short of said outer boundary by an amount in the range of 1/32nd to ⅛th inch.

24. A label construction according to claim 1 wherein said carrier is a rectangular sheet made of paper and said label face film terminates short of the edges of said sheet.

25. A dry-release label construction comprising:

(a) a carrier having a strong release surface on one side thereof and a weak release surface on an opposite side thereof; and (b) at least one label releasably adhered to said strong release surface, said at least one label comprising a label face film overlying and releasably adhered to said strong release surface, said label face film being dry and non-tacky at room temperature and having heat-sealing properties, and a pressure-sensitive adhesive layer overlying said label face film, said adhesive layer being smaller in area than said label face film and being disposed so that an area of said face film surrounding said adhesive coating is free of said adhesive.

26. A label construction according to claim 25 wherein said label face film has an outer boundary, and said adhesive layer terminates short of said outer boundary by an amount in the range of 1/32nd to ⅛th inch.

27. A label construction according to claim 25 having a plurality of said labels releasably attached to said strong release surface.

28. A label construction according to claim 27 wherein said carrier is an elongate web, and further wherein said web is wound on itself so that said adhesive layer of each of said plurality of labels is engaged by said weak release surface.

29. A dry-release label construction comprising:

(a) a carrier having a strong release surface on one side thereof and a weak release surface on an opposite side thereof; and (b) at least one label releasably adhered to said strong release surface, said at least one label comprising a label face film with heat-sealing properties overlying and releasably adhered to said strong release surface, said label face film being in the form of a lacquer that is dry and non-tacky at room temperature and becomes tacky when heated to a temperature in the range of 50 to 120 degrees C, and a pressure-sensitive adhesive layer overlying said label face film, said label face film and said adhesive coating having finite geometrical dimensions, with the adhesive layer having at least one edge that terminates short of a corresponding edge of the label face film by a predetermined amount.

30. A label construction according to claim 29 wherein said carrier is an elongate web, and further wherein said web is wound on itself so that said adhesive layer of each of said plurality of labels is engaged by said weak release surface.

31. A label construction according to claim 30, wherein said web is made of paper and said strong and weak release surfaces are silicone films.

32. A label construction according to claim 29 wherein said carrier is a sheet with a rectangular edge configuration, and further including a second label construction in stacked relation therewith, with the adhesive layer of the label of said second label construction being in contact with the weak release surface of said carrier sheet.

33. A label construction according to claim 29 wherein said lacquer is a UV-cured composition formed from a mixture of photo-polymerizable multi-functional monomers and prepolymers, a photoinitiator, and at least one tackifier selected so that said face film is non-tacky at room temperature and becomes tacky when heated to a temperature of 50–120 degrees C.

34. A label construction according to claim 29 wherein said strong release surface has a release value 3 to 10 times as great as the release value of said weak release surface.

35. A label construction according to claim 29 wherein said label face film is a UV-cured lacquer and said adhesive layer is a UV-cured material.

36. A label construction according to claim 25 wherein said label face film and said pressure-sensitive adhesive layer are formed of solvent based materials.

* * * * *

UNITED STATES PATENT AND TRADEMARK OFFICE

CERTIFICATE OF CORRECTION

PATENT NO. : 5284688

DATED : February 8, 1994

INVENTOR(S) : Norman A. Hiatt

It is certified that error appears in the above-identified patent and that said Letters Patent is hereby corrected as shown below:

Claim 22, column 13, line 61, the number "22" should be changed to -- 21 --.

Signed and Sealed this

Fourteenth Day of June, 1994

Attest:

Bruce Lehman

BRUCE LEHMAN

*Attesting Officer* *Commissioner of Patents and Trademarks*